J. BOYD.
Hay-Rack.
No. 221,279.  Patented Nov. 4, 1879.
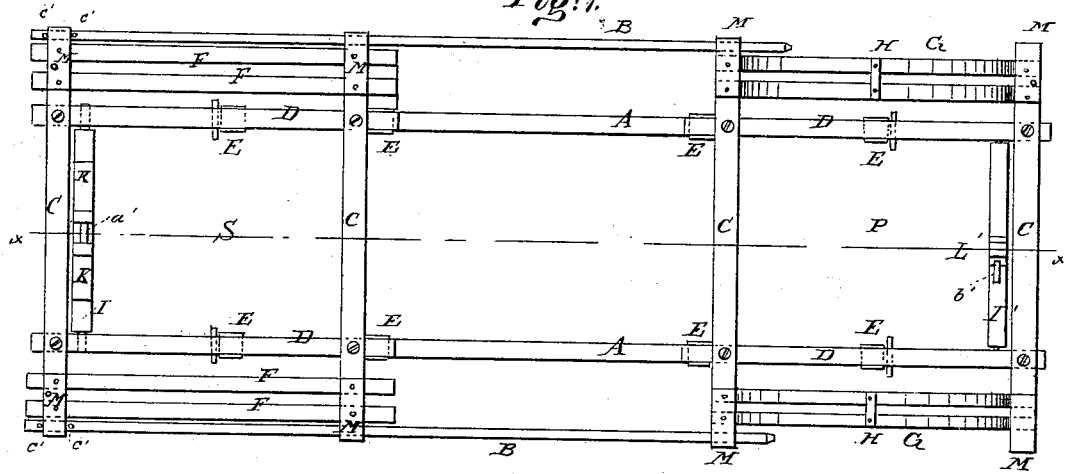
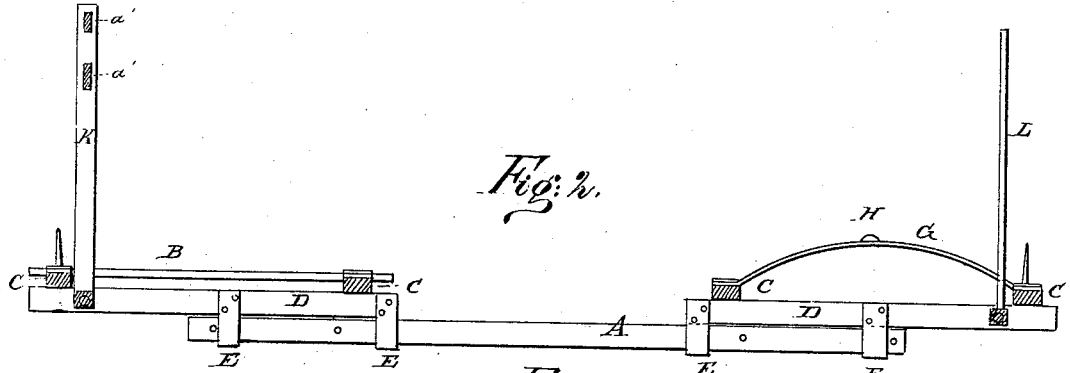
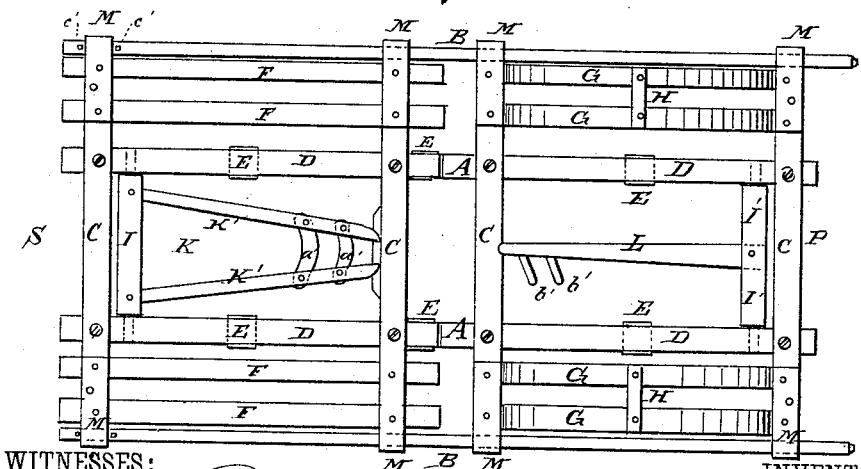
WITNESSES: Chas. Nida, C. Sedgwick
INVENTOR: J. Boyd
BY Munn & Co.
ATTORNEYS.

UNITED STATES PATENT OFFICE.

JOHN BOYD, OF LA GRANGE, INDIANA.

IMPROVEMENT IN HAY-RACKS.

Specification forming part of Letters Patent No. 221,279, dated November 4, 1879; application filed September 6, 1879.

*To all whom it may concern:*

Be it known that I, JOHN BOYD, of La Grange, in the county of La Grange and State of Indiana, have invented a new and Improved Hay-Rack, of which the following is a specification.

Figure 1 is a plan of the rack opened to its full extent. Fig. 2 is a longitudinal section of the same on line $x\ x$, Fig. 1. Fig. 3 is a plan of the rack closed.

Similar letters of reference indicate corresponding parts.

The object of this invention is to provide an adjustable hay-rack for wagons or sleds, that may be lengthened or shortened at will.

In the drawings, A A represent the bed-timbers, that, for ordinary service, will be about fifteen feet long and of the thickness necessary for proper strength.

B B are the side bars, that serve to stiffen the frame.

C C are the cross bed-pieces, bracing the rack transversely.

D D are the upper bed-pieces, that are held to the lower ones, A A, by the stirrups E E.

F F are the front-section top bars, and G G the wheel-bows on the rear section, whose ends are fastened to the cross bed-pieces C C, and that are connected and stiffened by the cross-pieces H H, that are pinned or bolted to them. The movable double tongue K is composed of ths rocking bar I, that is journaled in the front bed-pieces, D D, and of the bars K' K', that are mortised into the said rocking bar I, and are connected near their outer ends by the cross-pieces $a'\ a'$.

The movable single tongue L is composed of the horizontal rocking bar I', journaled in the rear bed-pieces, D D, into which is mortised the bar L, that is provided with two side pins, $b'\ b'$.

The upper bed-pieces, D D, are firmly pinned or bolted to the cross bed-pieces C C, and the top bars, F F, of the front section, S, and the bows G G of the rear section, P, are rigidly held to the cross bed-pieces C C by the clasps or clamps M M, that loosely grasp the side bars, B B, that have staying-pins $c'\ c'$ in one end.

The rack is strong and light, cheaply constructed, and durable. The sections can be easily separated from each other and handled by one person. It may be lengthened or extended from twelve to twenty feet or more, to fit any length of wagon or sled within reasonable limits.

If the ordinary style of rack be of proper length for a long wagon or sled it will, when put on a shorter one, project to the rear, so as to throw an undue portion of the weight of the load upon the rear axle, or will project forward and interfere with the horses. This device is open to neither of these serious objections.

Having thus fully described my invention, I claim as new and desire to secure by Letters Patent—

1. The combination of the bed-timbers A A, upper bed-pieces, D D, and stirrups E E, substantially as and for the purpose described.

2. The side bars, B B, in combination with the front and rear sections, S and P, of a hay-rack, substantially as herein set forth.

JOHN BOYD.

Witnesses:
 CHAS. H. NIMAN,
 ALONZO D. MOHLER.